Patented Sept. 10, 1940

2,214,211

UNITED STATES PATENT OFFICE 2,214,211

PROCESS FOR PRODUCING ZIRCONIUM METAL

Helmut von Zeppelin, Bitterfeld, and Ludwig Teichmann, Leverkusen-I. G. Werk, Germany, assignors, by mesne assignments, to Walther H. Duisberg, New York, N. Y.

No Drawing. Application January 18, 1940, Serial No. 314,450. In Germany January 24, 1939

5 Claims. (Cl. 75—84)

This invention relates to the production of zirconium metal.

It has been suggested to produce zirconium metal by passing vapours of zirconium chloride, which are formed by sublimation of solid zirconium chloride at and above about 250° C., over heated magnesium turnings; this process, however, cannot be worked on a commercial scale. It has further been suggested to first produce the double sodium-zirconium chloride by passing vapours of zirconium chloride over fused sodium chloride, and then cause the double compound thus produced to react with magnesium so as to produce zirconium metal. The production of the double salt in a first separate step of the process, however, is troublesome and is also attended with the drawback that it is not suitable for commercial production.

It is an object of the present invention to provide a process for the production of zirconium metal from zirconium chloride in a simple one-step process which can be easily worked on a commercial scale, since it does not involve the generation and use of zirconium chloride vapours.

It has been observed that, when heating zirconium chloride to temperatures of 250° C. and above, in the presence of an alkali metal chloride, the vapour tension of the zirconium chloride by virtue of the alkali metal chloride present is substantially reduced so that it is possible to heat a mixture of the aforesaid kind to temperatures well above to 250° C. without any substantial loss of zirconium chloride by volatilization. Losses of the latter kind are even negligible when the temperature of the mixture reaches that temperature at which zirconium chloride becomes reduced by magnesium metal provided that a sufficient amount of alkali chloride is present. In this respect it has been found that sodium chloride, when used as the alkali metal chloride, should be employed in an amount corresponding to about 50% by weight of the zirconium chloride, while when using potassium chloride, the amount of the latter compound is preferably approximately equal by weight to that of the zirconium chloride.

Based on the foregoing observations, the invention contemplates a process for producing zirconium metal by heating a mixture of zirconium chloride and an alkali metal chloride, in the aforesaid minimum proportions, and further a quantity of magnesium metal so as to cause reduction of the zirconium chloride by the magnesium. In order to facilitate the separation of the zirconium metal formed from the saline residue comprising magnesium chloride and the alkali metal chloride, the temperature of the reaction mixture is preferably raised to a point above the melting point of the said saline mixture which is lower than that of magnesium chloride alone.

Preferably the process is carried out by gradually heating the mixture of zirconium chloride, alkali metal chloride, and magnesium turnings, filings or chips in an iron crucible, until the saline contents are fused, whereupon the temperature is still further raised, with occasional careful stirring, up to about 800° C. The zirconium metal produced is allowed to settle in the fused saline residue, which is then decanted from the zirconium metal. The latter is then washed with water or, preferably, with a diluted hydrochloric acid solution so as to remove the last traces of saline residue.

Example 2600 parts by weight of zirconium chloride, 2600 parts by weight of finely ground potassium chloride and 585 parts by weight of magnesium turnings are mixed and gradually heated to 750° C. in a loosely covered iron crucible. When the reaction mass is fused, the whole is briefly stirred with care and subsequently allowed to cool to 700° C. in the crucible, whereupon the whole contents of that crucible are transferred to another vessel. The zirconium metal formed is allowed to settle on the bottom of this vessel, while the supernatant saline melt solidifies, thus forming a cake containing the zirconium metal at the bottom. The cake is then removed from the vessel and the major portion of the saline residue cut off from the bottom containing the zirconium metal. The latter is then lixiviated with moderately diluted hydrochloric acid. 900 parts by weight of pulverulent zirconium metal are obtained.

We claim:

1. A process for producing zirconium metal, which comprises heating a mixture comprising a quantity of zirconium chloride, a quantity of an alkali metal chloride by weight at least about equal to half the charge of zirconium chloride, and further a quantity of magnesium metal, so as to cause reduction of the zirconium chloride by the magnesium, and separating the saline melt from the zirconium metal produced.

2. A process for producing zirconium metal, which comprises heating a mixture comprising a quantity of zirconium chloride, a quantity of an alkali metal chloride by weight at least about equal to half the charge of zirconium chloride, and further a quantity of magnesium metal, to a temperature above the melting point of the mixture of magnesium chloride and alkali metal chloride produced during the ensuing reaction, and separating the saline melt from the zirconium metal produced.

3. A process for producing zirconium metal, which comprises heating a mixture comprising a quantity of zirconium chloride, a quantity of an alkali metal chloride by weight at least about equal to half the charge of zirconium chloride, and further a quantity of magnesium metal, to a temperature of about 800° C., and separating the saline melt from the zirconium metal produced.

4. A process for producing zirconium metal, which comprises heating a mixture comprising a quantity of zirconium chloride, a quantity of sodium chloride by weight about equal to half the charge of zirconium chloride, and further a quantity of magnesium metal, to a temperature above the melting point of the mixture of magnesium chloride and alkali metal chloride produced during the ensuing reaction and separating the saline melt from the zirconium metal produced.

5. A process for producing zirconium metal, which comprises heating a mixture comprising a quantity of zirconium chloride, a quantity of potassium chloride about equal, by weight, to the said quantity of zirconium chloride, and further a quantity of magnesium metal, to a temperature above the melting point of the mixture of magnesium chloride and potassium chloride produced during the ensuing reaction, and separating the saline melt from the zirconium metal produced.

HELMUT von ZEPPELIN.
LUDWIG TEICHMANN.